Jan. 20, 1925.
C. M. BAUER
LAWN EDGE CUTTER
Filed May 5, 1924
1,523,797
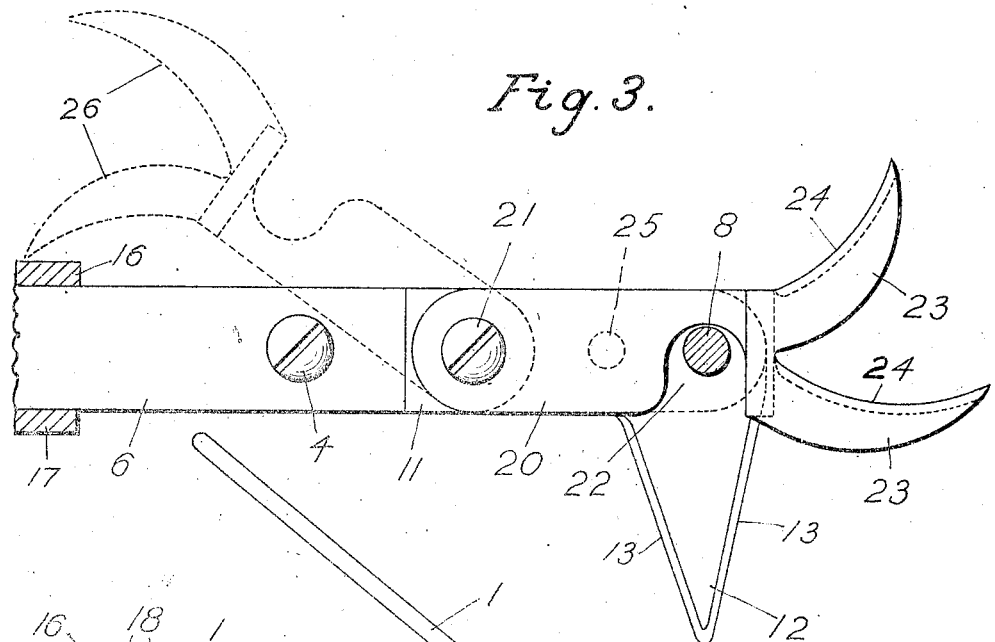
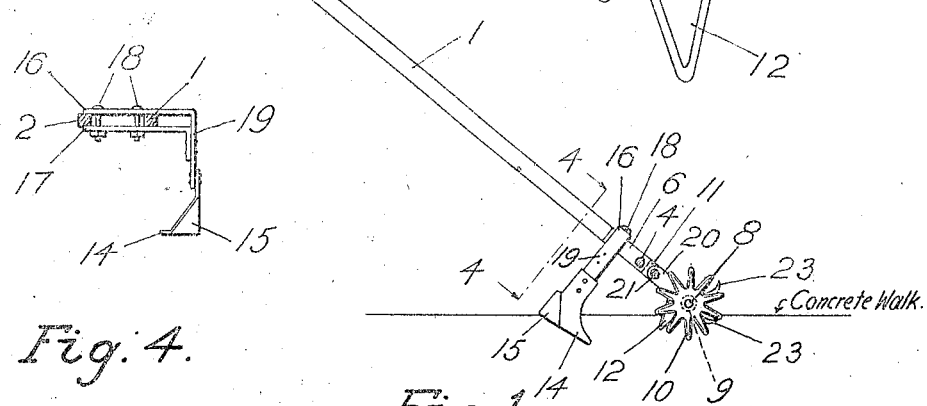
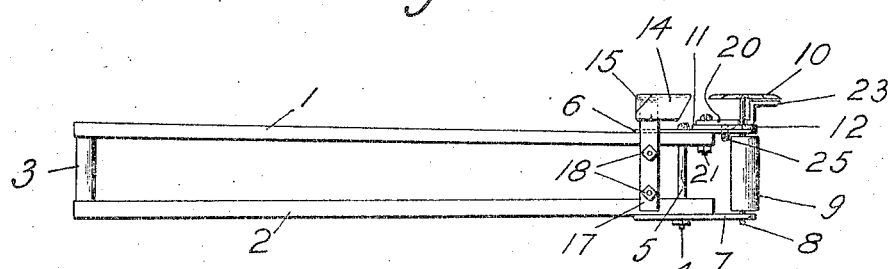

Patented Jan. 20, 1925.

1,523,797

UNITED STATES PATENT OFFICE.

CARL M. BAUER, OF PORTLAND, OREGON.

LAWN-EDGE CUTTER.

Application filed May 5, 1924. Serial No. 711,121.

*To all whom it may concern:*

Be it known that I, CARL M. BAUER, a citizen of the United States, residing at Portland, in the county of Multnomah and State of Oregon, have invented a new and useful Lawn-Edge Cutter, of which the following is a specification.

My invention relates to lawn edge cutters in which a spur wheel and a plowshare are attached to a frame, the spur wheel preceding and marking out a strip of sod, the plowshare following and lifting the strip to one side.

The objects of my invention are to produce a device which is very convenient to operate and which saves time and labor in trimming a lawn adjacent to a concrete walk.

Other objects and advantages are to be found in the construction and arrangement of parts as will be described in the specification and particularly pointed out in the appended claims.

I attain these objects with the mechanism illustrated in the accompanying drawing, in which—

Fig. 1 is a side view of my apparatus in operative position.

Fig. 2 is a plan view of the under side of Fig. 1.

Fig. 3 is a detail of the working head of the frame, the spur wheel and plowshare being omitted.

Fig. 4 is a section through Fig. 1 along the line 4—4.

Similar numerals refer to similar parts throughout the several views.

The present practice in trimming a lawn adjacent to a concrete walk is to use a spade or spade-like instrument and to dig a small groove step by step—a rather tedious operation. After the groove has been cut and the grass begins to grow out again, the groove must be cleaned with a spade or trowel and the over hanging grass must be trimmed by hand with a pair of grass shears, this again is a tedious and frequently back breaking task. In such cases I employ the following device.

I use the two sticks 1 and 2 to form the two opposing sides of a substantially rectangular frame. At one end the two sticks are connected by a handle 3; rigidity and spacing at the other end is maintained by a bolt 4 traversing a pipe sleeve 5. Attached to the outside of the sticks at the last-named end are the two flat bars 6 and 7 which project substantially beyond the ends of the sticks and form bearings for the shaft 8. Firmly mounted on the shaft, between the bars 6 and 7, is a rubber covered roller 9. One end of the shaft proceeds about two or three inches beyond the bar 6 and has affixed to the terminal the spur wheel 10, the spurs of which have cutting edges on that side which is nearest to the roller 9. Riveted to the bar 6 is a thin plate of steel 11 of which the most important feature is the downwardly projecting knife blade 12. This knife blade has partly the function of guiding the apparatus along the edge of the concrete walk and partly of cutting and loosening the sod from the concrete, for which latter purpose the edges of the knife blade are sharpened at 13. Following behind the spur wheel, and lifting the strip of sod cut by the knife blade and the spur wheel, is a plowshare 14. The heel 15 of the plowshare is deflected in a suitable manner to throw the strip of elevated sod over onto the walk from whence removal is an easy matter. Connection between plowshare and sticks is accomplished by means of the straps 16 and 17 which cross the sticks at the upper and lower side respectively and are clamped to said sticks by means of the bolts 18; this method of fastening enables the operator to shift the plowshare either farther toward the handle or toward the spur wheel as convenience dictates. The plowshare is riveted to the downwardly extending arm 19 of the strap 16 and, in case one plowshare wears off, another can easily be riveted in place.

Where the groove is newly made, the pressure of the spur wheel against the sod will cut any over hanging grass blades, so that the edge will present a trimmed appearance without any additional work, but in an old groove the grass cannot be cut in the same way and the detail illustrated in Fig. 3 is requisitioned into use. This detail consists of a flat bar of steel 20 which is pivoted to the stick 1 by means of the bolt 21; after proceeding parallel to the stick, past the shaft 8 with a suitable kerf 22 in the bar to accommodate the shaft, said bar bends parallel to the shaft toward the spur wheel and, on reaching the latter, splits into two curved shearing prongs 23 which proceed parallel to the plane of the spur wheel and have the upper edge 24 sharpened whereby the grass blades are severed through shearing action with the spur wheel. An adjusting screw 25 in the bar 6 and the steel plate 11 secures close shearing contact between the prongs 23 and the spur wheel 10. Where the prongs are not required as in cutting a new groove said prongs can be thrown backward into the position indicated by the dotted lines 26 in Fig. 3. For the sake of convenience the combination of elements at the end of the sticks opposite the handle may also be designated as working head.

Having thus described my invention it will be seen that my objects have been accomplished and, though I have shown the preferred form of construction, I reserve to myself the right to make minor changes providing I do not contravene the spirit and principle of my invention.

I claim:

1. In a lawn edge cutter, the combination of a frame, a handle, and a working head, said working head comprising a guiding knife projecting downwardly from the frame, a roller at one side of the guiding knife and in front of the frame, a spur wheel at the other side of the guiding knife, shearing prongs, and a plowshare.

2. In a lawn edge cutter, the combination of a frame, a handle, and a working head, said working head comprising a guiding knife, a roller, a spur wheel, shearing prongs cooperating with the spur wheel, and a plowshare.

3. In a lawn edge cutter, the combination of a frame, a handle, and a working head, said working head comprising a guiding knife, a roller, a spur wheel cooperatively connected with the roller, shearing prongs pressing against the side of the spur wheel between guiding knife and spur wheel, and a plowshare.

4. In a lawn edge cutter, the combination of a frame, a handle, and a working head, said working head comprising a guiding knife, a roller, a spur wheel in laterally spaced relation to the guiding knife, shearing prongs, and a plowshare disposed in the space between guiding knife and spur wheel and rearwardly thereof.

5. In a lawn edge cutter, the combination of a frame, a handle, and a working head, said working head comprising a guiding knife, a roller, a spur wheel in laterally spaced relation to the guiding knife, shearing prongs pressing against the side of the spur wheel and being capable of temporary disconnection, and a plowshare disposed in the space between guiding knife and spur wheel and rearwardly thereof.

6. In a lawn edge cutter, the combination of a frame, a handle, and a working head, said working head comprising a guiding knife, a roller, a spur wheel in laterally spaced relation to the guiding knife, shearing prongs, and a plowshare disposed in the space between guiding knife and spur wheel and rearwardly thereof, said rearward distance being variable.

7. In a lawn edge cutter, the combination of a frame, a handle, and a working head, said working head comprising a guiding knife, a roller, a spur wheel, shearing prongs, and a plowshare, and straps for attaching said plowshare to the frame, said straps being adjustably mounted on the frame.

Signed by me at Portland, Oregon, this 29th day of April, 1924.

CARL M. BAUER.